Sept. 23, 1952 S. F. RESAN 2,611,488
GREASE TRAP

Filed May 18, 1946 7 Sheets-Sheet 1

Inventor:
Stephen F. Resan
By Thiess, Olson & Mecklenburg
Attys.

Sept. 23, 1952  S. F. RESAN  2,611,488
GREASE TRAP
Filed May 18, 1946  7 Sheets-Sheet 3
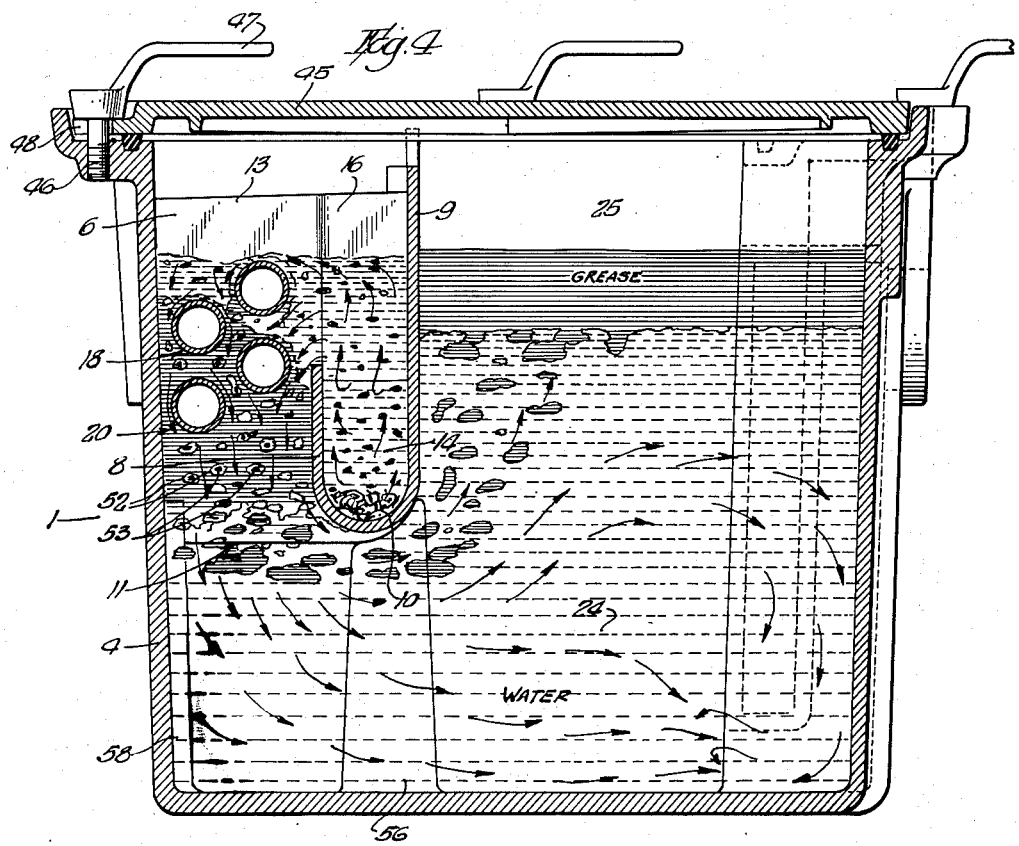
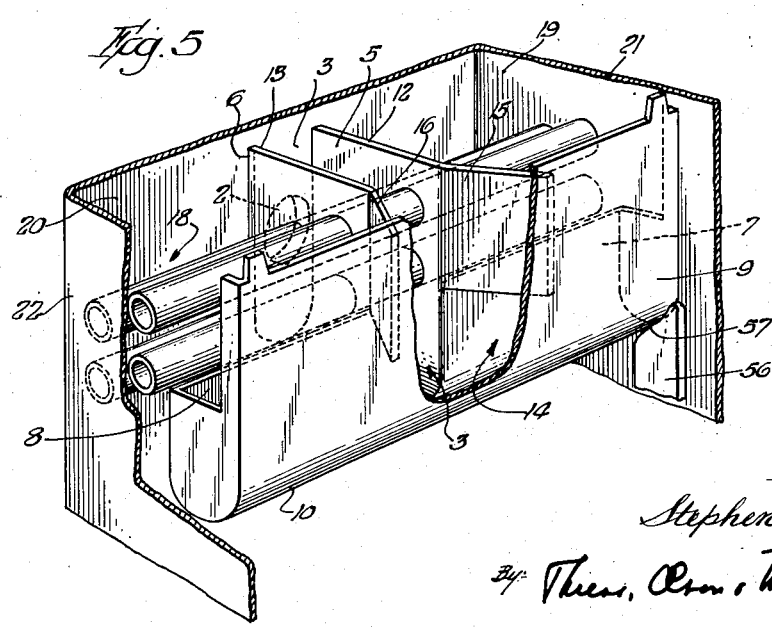
Inventor
Stephen F. Resan

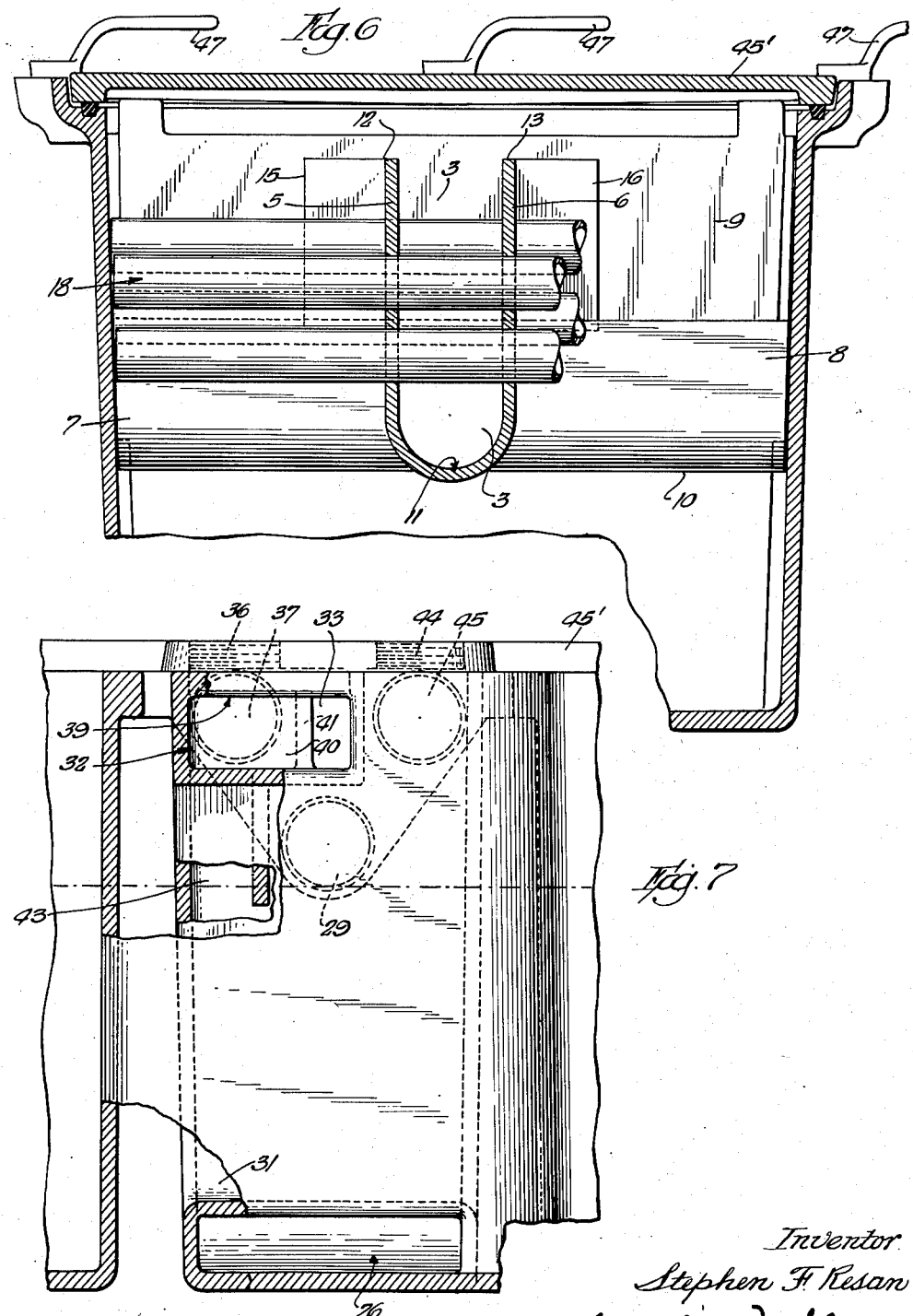

Sept. 23, 1952　　　　　　S. F. RESAN　　　　　　2,611,488
GREASE TRAP
Filed May 18, 1946　　　　　　　　　　　　　7 Sheets-Sheet 5
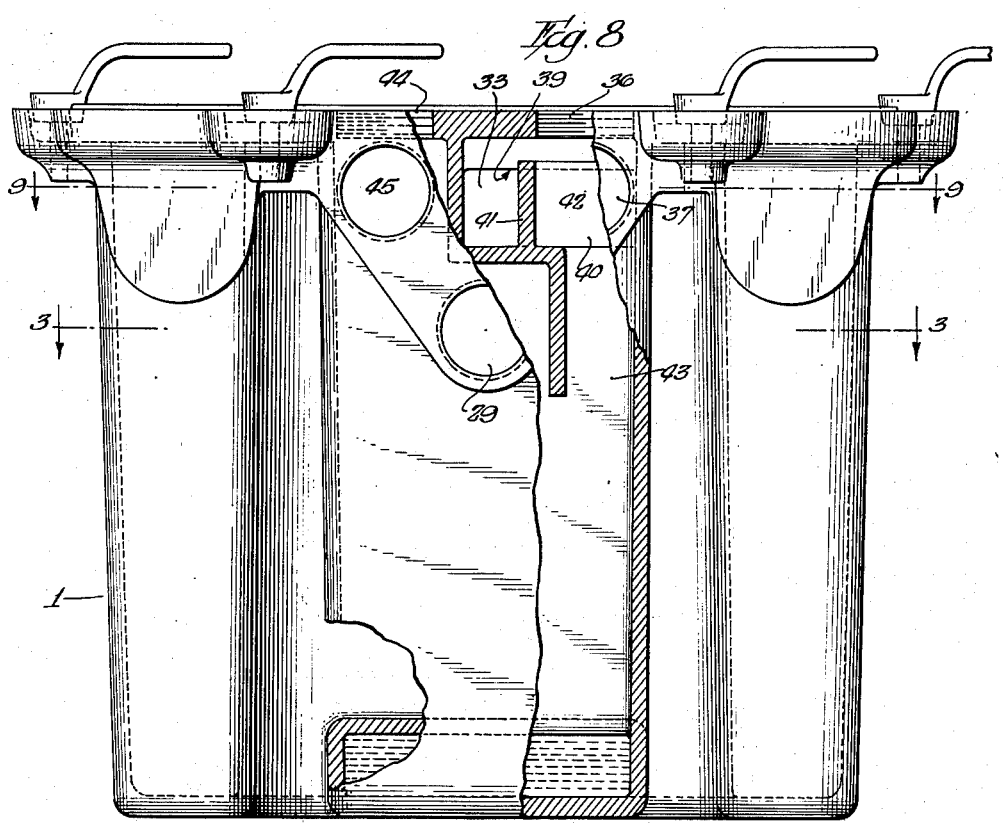
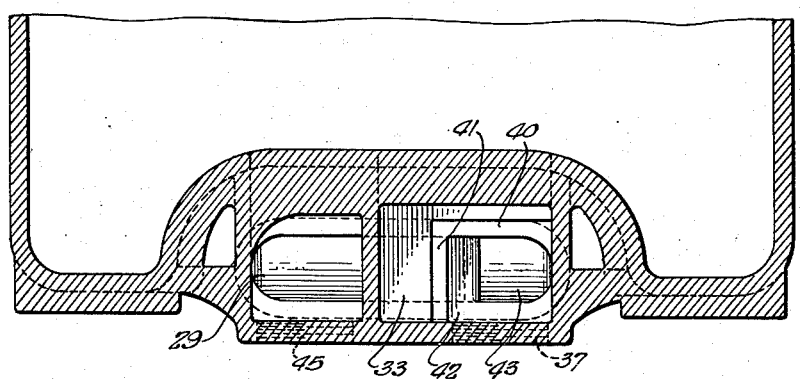
Inventor.
Stephen F. Resan

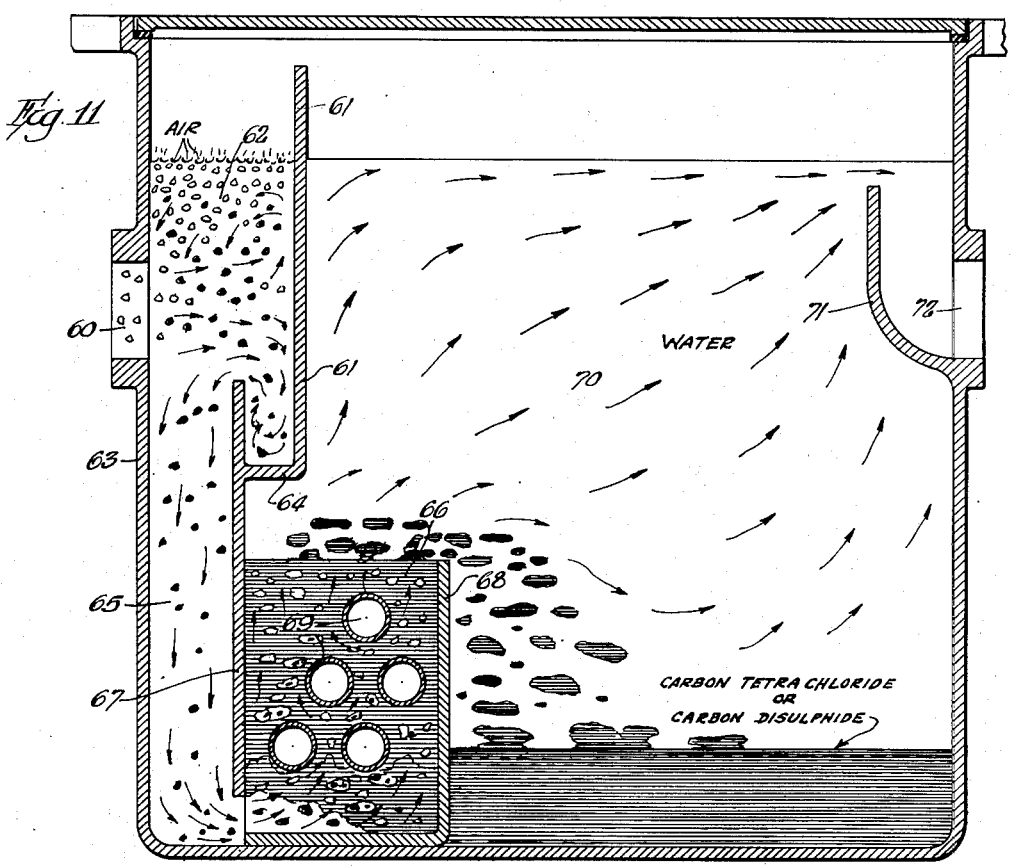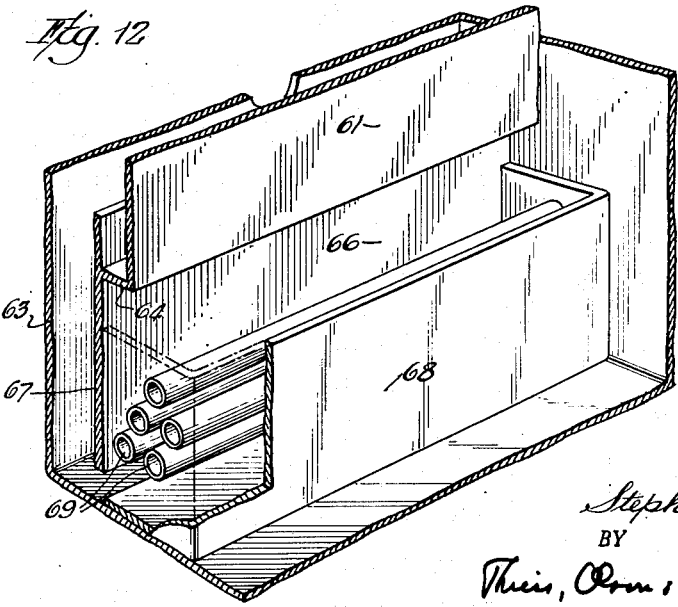

Patented Sept. 23, 1952

2,611,488

UNITED STATES PATENT OFFICE 2,611,488

GREASE TRAP

Stephen F. Resan, Elgin, Ill., assignor to Woodruff & Edwards, Inc., Elgin, Ill., a corporation of Illinois Application May 18, 1946, Serial No. 670,659

17 Claims. (Cl. 210—43)

1

This invention relates to the separation of mixtures of immiscible materials having different surface tensions.

Broadly, the invention is directed to the separation of a dispersion or emulsion of insoluble materials by means of selective surface tension effects.

To this end, the invention is directed to the separation of insoluble liquids by means of hydraulic filtration.

A specific embodiment of my invention may be in the form of an improved grease trap which operates upon the combined principles of gravity and surface tension separation. It will, however, be understood that the invention may readily be adapted to other uses, and hence, the invention is not to be limited to grease traps solely.

I have discovered a means whereby very fine or colloidal dispersions or emulsions of liquid-liquid or liquid-solid materials may be rapidly and efficiently separated. The principle of my new separating process is based upon surface tension phenomena. Different liquids have different surface tensions. The surface tension of a liquid material depends upon the degree or amount of attraction between the individual molecules of the liquid within the liquid medium. By allowing a stream of an emulsion or dispersion of insoluble materials to contact a bed of surfaces having predetermined surface tension properties, there may be obtained a selective surface tension separating effect wherein one of the ingredients in the dispersion or emulsion will be selectively deposited upon these surfaces.

By means of the above surface tension phenomenon, it becomes possible to apply a different principle of filtration, namely, the application of hydraulic filtering to the separation of insoluble liquids or materials. The invention contemplates that the filter element may also be one of the insoluble liquids which it is desired to collect. Thus, a mixture of water and oil may be brought into proper contact with either an oil layer to serve as a filter element or a water layer to serve as a filter element, depending upon which is to be separated and collected in a vessel. If it is desired to collect oil in a vessel which receives a mixture of oil and water wherein water is the dominant liquid, then the filter element or filter layer may be oil, and this may be located at or near the surface of the hydraulic filter vessel. If the desired action is to be reversed, namely, the mixture contains oil as the dominant liquid, then the filter layer or filter element may be water, and this may be located at or near the bottom of the hydraulic filter vessel. The water-in-oil emulsion can then be directed to flow upwards through the hydraulic filter element, namely, water, to collect the water.

The preferred form of my hydraulic filter element is that of a series or nest of parallel pipes, rods or tubes. The surface of these pipes or rods should be such as to exercise a preferential selective surface tension effect on one of the water immiscible liquids. For grease trap purposes, where there is a mixture of water and oil, such mixture may be directed under uniform flow but in a non-turbulent condition to a layer or nest of parallel iron pipes. As the liquid mixture drops onto the nest of iron pipes, it will divide into a mixture consisting of globules of water and globules of oil or grease. The material which is nominally fed to grease traps consists of a liquid dispersion or emulsion wherein the oily material is the minor ingredient and the water the major ingredient. Under such circumstances, any globules of grease or oil, which are within the globules of water surrounding the oil, will tend to flow to the surface of the water globule because of the difference in specific gravity. The surfaces of the pipes have a preferential surface tension effect for the oil over the water. This results in greater wetting power of the oil for the pipe surface. Because of this existing preferential force, the globules of water which contain small globules of oil or grease at their surface will be subjected to a separating effect upon coming in contact with the pipe surfaces, with the result that the globules of oil at the surface of the globules of water will be removed and deposited in the form of an oil or grease layer on the nest of pipes.

The hydraulic filter herein disclosed is basically different from the filters heretofore used. Although the filter element is one of the insoluble liquids which it is desired to collect, fundamentally the finely divided particles in the mixture are brought into intimate contact with the main body of the filter. Where the mixture is of grease and water and the dominant fluid is water, the filtering layer will be grease. The formation of the filtering layer is initially formed about the tension tubes by the preferential surface effect of the latter for the grease. Continued flow of the mixture results in any grease in the globules of the mixture coming to the surface of the globules and adhering to the filtering bed which remains about the tubes by the retaining force exerted by the tubes on the grease layer and by gravity.

Several preferred forms of structure are disclosed herein, but it is found desirable to reduce the velocity of the mixture and to liberate the air therein and cause it to escape to atmosphere. Air bubbles within the mixture cause turbulence and they should be eliminated as rapidly as possible. To this end, the invention is embodied in one of its preferred forms in apparatus conducting the incoming jet of high velocity mixture into a longitudinal channel to cause the influent to impinge against a portion of the tension tubes whereby the mixture will distribute itself more uniformly in velocity and the velocity will be reduced in magnitude. This arrangement of structure to effect a reduction in velocity results in the escape of air contained in the mixture by causing the air to rise to the surface. Further reduction in velocity may be effected to insure the escape of air by the use of buffing means in any suitable form, as by diverging walls, to divide the flow and to distribute more uniformly the kinetic energy of flow. The use of weirs may change the direction of flow, which may be reverse to that of the influent, so as to cause the mixture to fall upon the tension tubes and the filtering bed thereabout.

The invention is concerned with structure that keeps the velocity of the mixture flowing through the filtering bed low enough so that the forces caused by the kinetic energy will not tear the grease away from the tension tubes. Thus, the structure should be of a character that the velocity of the mixture be maintained at a point where the dislodging force of the incoming mixture will not overcome the retaining force exerted by the tension tubes on the grease layer, but this velocity should be enough to release the collecting grease at the filter bed in solidified or semi-solidified agglomerates or masses that may move away from the bottom and rise to a collecting chamber in the apparatus.

Examples of immiscible liquid emulsions which may be separated into their individual components by means of the above-described type of apparatus are mixtures of oil and water, petroleum and water, water and mercury, glycerin and carbon tetrachloride, water and carbon tetrachloride, water and carbon disulphide, and turpentine and water.

Referring now to the drawings,

Fig. 4 is a cross section taken on line 4—4 of Fig. 1;

Fig. 5 is a perspective view of the hydraulic filter type grease trap illustrated in Figs. 1 through 9;

Fig. 6 is a cross section taken on line 6—6 of Fig. 1;

Fig. 7 is a cross section taken on line 7—7 of Fig. 1;

Fig. 8 is an end view partly in elevation and partly in section looking in the direction of the arrows along line 8—8 of Fig. 1;

Fig. 9 is a transverse section taken along line 9—9 of Fig. 8;

Fig. 11 is a cross section taken on line 11 of Fig. 10; and

Fig. 12 is a perspective view of the trap shown in Figs. 10 and 11.

Figure 1:
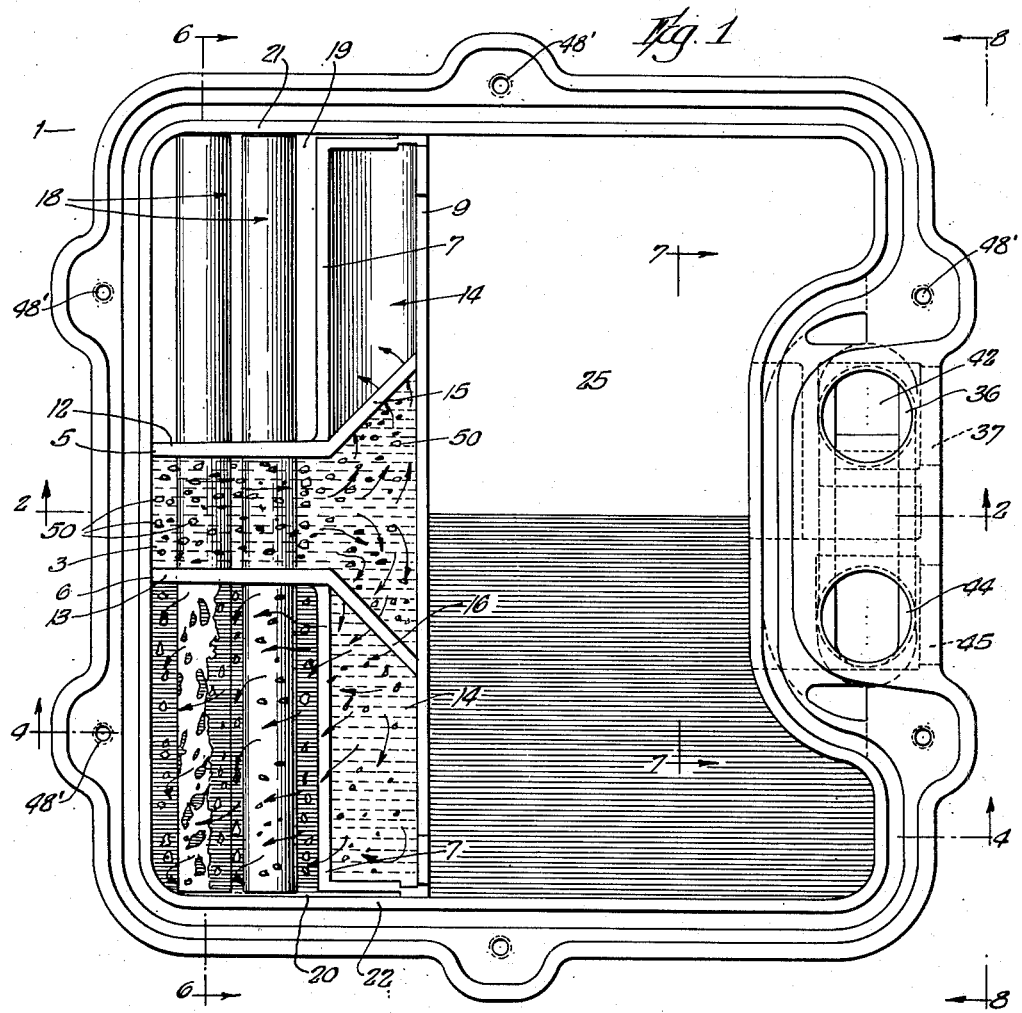
Fig. 1 is a plan view with the top cover removed, showing a hydraulic filter construction designed as a grease trap wherein the hydraulic filter serves as a grease layer filter element, a portion of the structure illustrating the flow of the influent.

Referring now to the device shown in Figs. 1 to 10, inclusive, the exact shape or arrangement of the parts may vary, but, as illustrated, the influent may enter at opening 2 in front wall 4 of housing 1 and flow through a longitudinal channel 3. Channel 3 may be defined by two vertical side walls 5 and 6 suitably supported to extend inwardly from front wall 4 to meet and join weirs 7 and 8 disposed transversely in housing 1 and forming a part of a unit in which a cross channel 14 is provided, which unit includes an arcuate base or floor 10 and a wall 9 disposed preferably parallel to weirs 7 and 8. Channel 3 is also provided with an arcuate base or floor 11 which may be integrally or otherwise formed with side walls 5 and 6, opening 2 being so related with respect to these parts that the influent entering opening 2 will not overflow the top edges 12 and 13 of side walls 5 and 6, the latter being cut away at these edges, if so desired, and lower than the wall 9.

Side walls 5 and 6 continue forwardly across lateral channel 14 at their upper part in diverging relation, wings 15 and 16 being formed which preferably engage against wall 9 and leave openings therebelow to permit channel 14 to be continuous crosswise so that the influent entering longitudinal channel 3 will flow in opposite directions through channel 14 and rise to overflow weirs 7 and 8. Weirs 7 and 8 are preferably, although not necessarily, of less height than walls 5 and 6, and are of course of less height than their opposing parallel wall 9.

As will be later explained, the specific embodiment of the invention disclosed in Figs. 1 to 9, inclusive, is shown with weirs 7 and 8 considerably lower than wall 9 and at or about the level of the lower edge of the outlet opening of housing 1.

To provide a filter bed for the insoluble liquid or material to be filtered out of the mixture, a plurality of cross pipes designated broadly as 18 are provided to lie crosswise of longitudinal channel 3 and of two chambers 19 and 20 formed on opposite sides of channel 3 between weirs 7 and 8 and front wall 4 and the side walls 21 and 22 of housing 1. The relative positioning of pipes 18, which may also be termed tension tubes, will be clearly seen in Figs. 2, 4 and 5. These pipes 18 may be of iron when grease is to be filtered and are preferably passed through openings in side walls 5 and 6, either to enter openings in side walls 21 and 22 of casing 1 for support or to abut against side walls 21 and 22. In either case, pipes 18 are dispersed in a manner causing the mixture overflowing weirs 7 and 8 to fall over and upon them so that this mixture will be caused to flow through the filtering bed formed by these pipes and on which the material to be filtered collects to form a filtering layer. If the size of chambers 19 and 20 warrants, two vertical rows of pipes 18 are provided, the pipes of each row being staggered with respect to the pipes of the other row, the arrangement assuring that it all flows, as will be later explained in connection with the operation, the mixture will be brought into intimate contact with the filtering layer formed on these pipes and the material to be collected (or deposited) will have adequate opportunity to be filtered out of the mixture. The nested relation may vary in accordance with the requirements of a particular installation or in accordance with the nature of the insoluble liquid or material of the mixture to be filtered.

Figure 2:
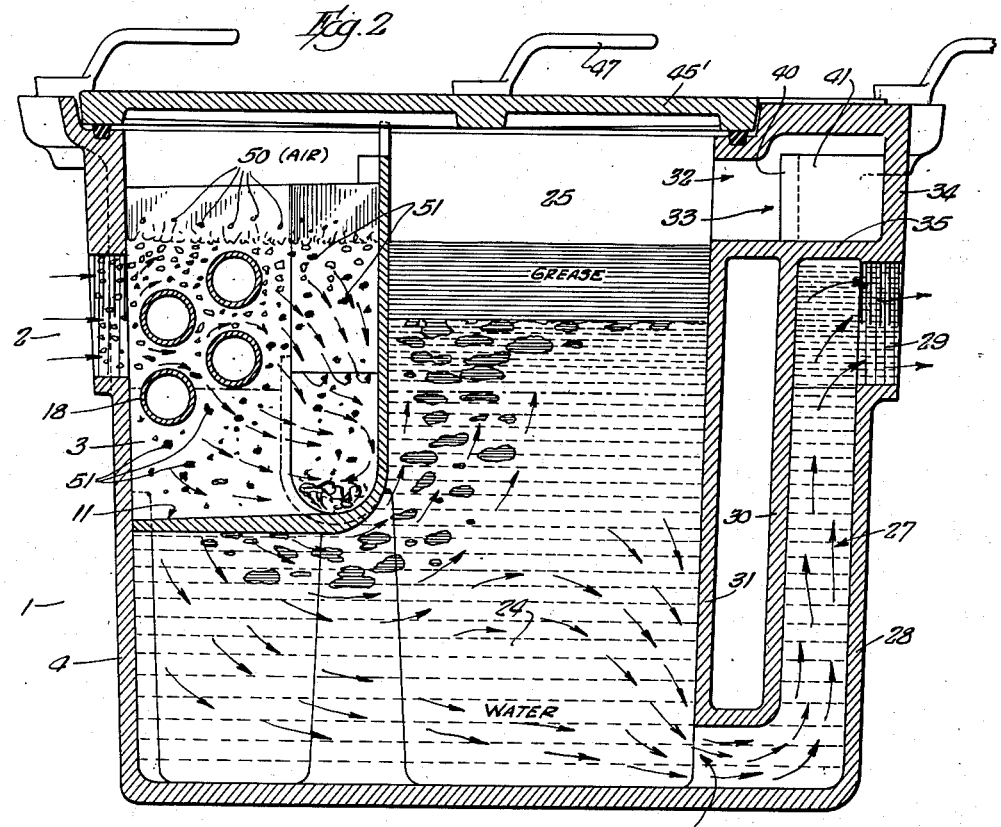
Fig. 2 is a cross section taken on line 2—2 of Fig. 1.
Figure 3:
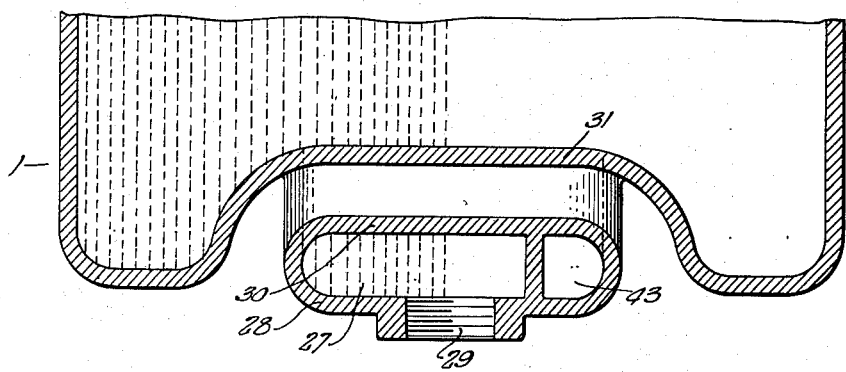
Fig. 3 is a cross section taken on line 3—3 of Fig. 8.

Below the separating chambers 19 and 20 there is the main body 24 of housing 1. The grease or other separated insoluble material breaks away from the filtering bed in agglomerates of varying sizes and accumulates at the top of the collecting chamber 25, the liquor flowing to outlet opening 26, as illustrated in Figs. 2 and 3, at the bottom of housing 1.

Opening 26 connects with a vertical passage 27 formed in the rear wall 28 of housing 1. Rear wall 28 has an outlet opening 29 therein to which may be attached the fitting forming the outlet connection (not shown). The other wall 30 of passage 27 is a part of a wall 31 in which opening 26 is provided, wall 31 having a second opening 32 communicating with a chamber 33 defined by a vertical wall 34 and a floor 35. Chamber 33 may communicate with either top opening 36 or side opening 37, both being threaded or otherwise provided for a connection to atmosphere. If the location of housing 1 does not admit of a top connection with opening 36, a plug (not shown) will be used to close off opening 36 and a connection will be made with side opening 37. The reverse connections may be made with the plug closing off side opening 37. Within chamber 33 are two vertical walls extending slightly above the top edge 39 of opening 32, the front wall 40 and the side wall 41. These walls 40 and 41 form a separate chamber 42 within chamber 33 which communicates with chamber 33 at a level above top edge 39 of opening 32 (see Figs. 7 and 8), the walls 40 and 41 being spaced from the walls of chamber 33 so that chamber 42 will be open to communication without clogging with chamber 33. Chamber 33 communicates with chamber 24 by opening 32 and chamber 42 communicates with passage 27 by a vertical passage 43 which terminates at its lower end slightly lower than the bottom of outlet opening 29, chamber 42 also communicating either with top opening 36 or with side opening 37.

On the other hand, passage 27 not only communicates with outlet opening 29, but also with a top opening 44 and with a side opening 45. Depending upon the installation, a vent connection (not shown) is made with either while the other is plugged. Sewer gases sometimes tend to enter a grease trap and flow backwardly through the inlet connection 2 and its connection to the sink or tank. In the present structure, vent connections 44 or 45 tend to prevent this occurrence and also tend to prevent an undesirable accumulation of gas pressure. If this pressure increased in the upper part of passage 27 in the instant device, the normal non-flow level of the liquor in passage 27 might be depressed to break the liquid seal at the bottom of passage 43, thereby allowing this gas to enter chamber 24 and flow backwardly through the sink drain. Vent connections at 44 and 45 will prevent this pressure from building up.

Passage 43 and chambers 42 and 33 form antisiphoning means that will prevent any siphoning of the liquor in chamber 24 through outlet opening 29, this being true whether either opening 36 or 37 is connected to atmosphere or is plugged. As soon as the level of the liquor is below passage 43 so that it is open to passage 27, air either from chamber 24 or from vent connections attached to openings 36 or 37 will flow to outlet connection 29, either through opening 32 from chamber 34 or through chamber 42 from these said connections, and the siphoning action of the liquid will be broken.

Figure 1A:
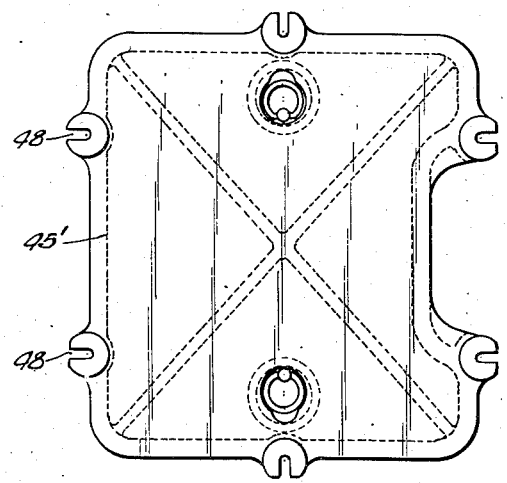
Fig. 1a is a top view, at reduced scale, of the cover.

Cover 45' illustrated in top plan view in Fig. 1a and in position on housing 1 in Fig. 4 provides a gas tight seal for chamber 24. It may be easily removed for permitting the cleaning of chamber 24 without disturbing the vent connections to top openings 36 and 44 or to side openings 37 and 45. By providing bolts 46 having handles 47, it is possible to provide slots 48 in cover 45' which will receive these bolts and permit ready manipulation of the handles to thread the bolts into openings 48' along the top edge of housing 1 whereby the cover may be quickly clamped upon the housing in tight relation. If so desired, a gasket 49 may be used to assure a gas tight seal.

The structure defining longitudinal channel 3 and lateral channel 14 may be formed as a unit for insertion or removal from housing 1. Whether the weirs 7 and 8, wall 9 and floor 10 are cast or formed in a single piece and the side walls 5 and 6, their floor 11 and diverging walls 15 and 16 are likewise cast or formed in a single piece, these parts may be first formed and attached together, with tension tubes 18 mounted crosswise in walls 5 and 6, before they are inserted in housing 1. Their arrangement permits a unitary relation that greatly facilitates the insertion and removal of this filtering part of the device disclosed herein because any suitable mounts such as shoulders or lugs 56 may be cast or otherwise provided on side walls 21 and 22 of housing 1 and have inwardly sloping top ledges 57 which tend to hold the filtering unit against front wall 4 and in operative relation with inlet opening 2. A forward mount 58 on front wall 4 may receive the front edge of floor 11 so that the structure will be suitably supported at this point. Thus, this filtering structure may be readily lifted out of housing 1 for cleaning.

It will be observed that floors 11 and 10 of passages 3 and 14 are curved. It is found that curving these floors tends to prevent eddy currents setting up in the incoming mixture and to reduce turbulence. A quiescent state tends to liberate trapped air from the mixture which is desirable to accomplish before the mixture spills upon the tension tubes or filtering bed formed about the tension tubes.

As to the operation of the device disclosed in Figs. 1 to 9, inclusive, when it is used as a grease trap, kitchen sink drainage consisting generally of a minor portion of oil and a major portion of water will enter longitudinal channel 3 at relative high velocity and will impinge against the portion of tension tubes 18 lying crosswise thereof. As the jet of high velocity mixture impinges said tubes, it is distributed more uniformly as to velocity, and, after passing through the tubes, the velocity will be reduced. This reduction of velocity makes it possible for the air contained within the mixture to rise to the surface and to escape to the atmosphere. Air bubbles within this mixture cause turbulence, and therefore, they should be eliminated as rapidly as possible. In Fig. 2, the air bubbles are indicated at 50 as hollow white circles while the grease or oil to be separated is indicated at 51 as solid black particles, the surrounding portion in white being water and other foreign matter that may be in the mixture. As the mixture proceeds to the end of longitudinal channel 3, diverging walls 15 and 16 further reduce the velocity by dividing the flow and causing it to move in opposite directions through cross channel 14, thereby further assuring a thorough escape of air bubbles. The walls 5 and 6 of longitudinal channel 3 are sufficiently high so that none of the incoming liquor overflows their top edges 12 and 13. The mixture now contains only grease and water with substantially all the air removed and has experienced further reductions in velocity to distribute more uniformly the kinetic energy of flow. The cross channel 14 acts as an open manifold for distributing the flow over the weirs 7 and 8, which, as previously stated, form one side of cross channel 14.

It is desirable to limit the height of weirs 7 and 8 to a distance slightly above the lower edge of outlet opening 29 so that the liquid level will be held slightly below the top of weirs 7 and 8 when the device is dormant. It will be observed that the top edge of weirs 7 and 8 is at a level about equal to the center of lower tension pipe 18 in the right-hand row as viewed in Fig. 4. At a low rate of flow of the influent, the mixture will spill over weirs 7 and 8, and be brought into intimate contact with this pipe 18 or the grease layer deposited thereon. At a slightly increased rate, the mixture will flow over this lower pipe 18 of the right-hand row and will also be brought into contact with both pipes 18 of the left-hand row or the grease layer deposited thereon. At full capacity flow, the level of the mixture in cross channel 14 will rise and the spill will reach the height of the higher pipe 18 of the right hand row (Fig. 4) and flow thereover, and also over the three remaining pipes 18. The arrangement of the pipes 18 shown in Fig. 4 results in a very efficient filtering of the grease from the mixture, but it will be understood that other arrangements might also be used.

It is found that as the mixture flows over weirs 7 and 8, it separates and forms a multitude of globules. The pipes 18 act as a filter layer for the oil or grease due to the greater wetting power of oil or grease for iron. When a coating or layer of oil is deposited on the iron surfaces (pipes 18), this oil layer functions further as a hydraulic filter for the oil globules in the emulsion as the emulsion flows downward over the nest of these surface tension tubes. This hydraulic filtering effect is due to the inter-molecular attraction of the molecules in the oil layer deposited on the iron surface. During the drop of the oil-in-water emulsion over the nest of surface tension tubes, any oil (designated as 53 and shown in black) which may be inside of the water globules 52 of the emulsion will come to the surface of the water globules before the emulsion passes through the oil layer deposited on the surface tension tubes. As the emulsion mixture of oil-in-water flows over the oil coated surface tension tubes, the oil layer deposited in the surface tension tubes will tend to pull apart and separate the oil globules from the oil-in-water emulsion passing over its surface. As the stream of emulsion continues to be fed to the hydraulic filter separating apparatus, the oil accumulates on the iron pipe surfaces and the water drops to the bottom of the chamber 24. After a sufficient weight of oil or grease has accumulated on the iron pipe surfaces to cause the same to drop from the pipe surfaces, the detached or trapped oil or grease is in the form of large agglomerates, as shown in Figs. 2 and 4. The large agglomerates flow with the water to chamber 24 and move to the rear thereof. Certain of the larger agglomerates will rise in chamber 24 as shown in Figs. 2 and 4 and accumulate as a layer at the top. The water with any agglomerates remaining therein will impinge against wall 31. This slows up the flow and the remaining oil agglomerates are given ample opportunity to rise to the surface and form a continuous layer of oil or grease, as shown. The water, which is the heavier liquid, remains on the bottom and passes through opening 26 and then upwards to the outlet 29.

The surface forces of attraction which are operating on the pipe surfaces to cause the separation of the lighter liquor from the heavier liquor are a combination of two phenomena. When the emulsion of the two immiscible liquids is first caused to flow downward through the bed of pipes, and when the surfaces of these pipes have not yet been contacted or coated, the surface force which is operating is the low interfacial tension between the fresh pipe surface and one of the immiscible liquids of the emulsion. In this particular case, namely, Figs. 1 to 9, the apparatus is constructed for an emulsion wherein the lighter liquid is the one having surface tension and interfacial tension properties bringing about a selective coating or deposit of the lighter liquid on the pipe surface. When the fresh pipe surface has had deposited a thin coating of the lighter liquid component, there comes into play another surface attraction force, namely, the forces of attraction between the molecules of the lighter liquid. The intermolecular force of attraction between the molecules of the lighter liquid is greater than the intermolecular force of attraction between the molecules of the other immiscible liquid being deposited on the pipe surface. Hence, a stream of emulsion flowing through the bed of pipes 18 after the pipe surfaces have been initially coated with the lighter liquid creates a condition wherein the globules of lighter liquor in the moving emulsion readily unite with the main layer or coating of lighter liquor that has already been deposited on the pipe surfaces. The removal of the lighter liquor from the heavier liquor by means of the pipe surfaces under the conditions described is a very positive effect, because the force holding the lighter liquor globule to the heavier liquor globule in the influent emulsion is readily overcome by the force between the main layer of lighter liquor on the pipe surface and the globule of lighter liquor in the emulsion passing the same.

Figure 10:
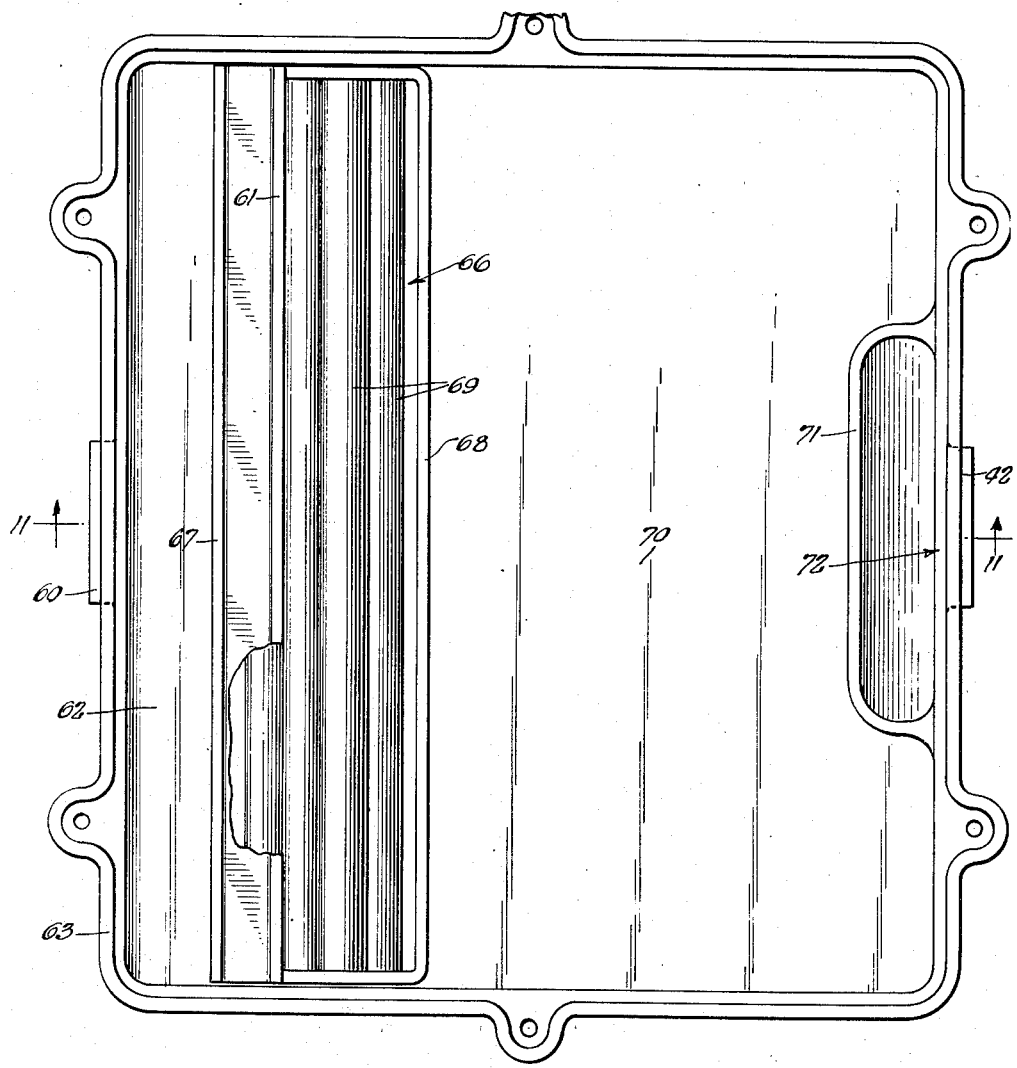
Fig. 10 is a top view with the top cover removed of a grease trap construction wherein the hydraulic filter serves as a water filter element.

The arrangement shown in Figs. 10 to 12, inclusive, may be used where the emulsion mixture consists of either water and carbon tetrachloride, water and carbon disulphide, or glycerine and carbone tetrachloride. As will be noted in these views, the influent will enter inlet opening 60 and its velocity will be reduced by baffle wall 61 and by the open baffle chamber 62 defined by walls 61, 63 and 64. The mixture will drop to the bottom of passage 65 and will enter chamber 66 between wall 67 and a vertical wall 68 having sides that may abut against or be spaced from the walls of the housing of the device. Upon reaching chamber 66, the mixture will be forced upwardly onto a nest of surface tension tubes 69 similar to the tubes 18. These tubes have an outer surface which are preferentially wetted by carbon tetrachloride or carbon disulphide. As the emulsion moves upwards through this nest of horizontal tension tubes, the carbon tetrachloride or carbon disulphide, due to its greater wetting power, deposits as a layer on the surface of the tubes, and then passes on upwards through the nest of tubes 69 and overflows over the wall 68, thereby entering the large chamber 70. Some of the carbon tetrachloride or carbon disulphide will not be caught by the hydraulic filtering effect on the tension surface tubes and will be carried over with the water. The carbon tetrachloride or the carbon disulphide is, however, in the form of large agglomerates by the time the emulsion has passed upwards through the nest of tubes 69. These agglomerates, being distinctly heavier than water, readily settle to the bottom of the large central chamber 70 and the water rises to the top of the chamber. Baffle 71 tends further to slow up the flow of liquor through the grease trap and thereby bring about a more complete oil-water separation by giving the water more time to rise to the top. The water then overflows the baffle wall 71 and passes out through the outlet 72. An example of the pipe surface, which is suitable for the preferential wetting by carbon tetrachloride and carbon disulphide over water, and which may be used in my device, may be a thermoplastic material such as polystyrene, ethyl cellulose, or any other suitable synthetic resinous condensation product.

A fine emulsion or dispersion of liquid mercury and water may also be treated by the apparatus illustrated in Figs. 10, 11 and 12. I have found, however, that it is desirable to employ tension tubes having surfaces of either copper, brass, nickel, silver or gold when it is desired to filter the mercury out of the water because the wetting power of mercury for these metals is quite substantial and the mercury will therefore readily coat such surfaces for the tension tubes and thereby separate the mercury particles from the surrounding water particles as the mixture moves through the filtering layer deposited on the tube surfaces. It will be understood of course that the mercury will free itself in substantial sized particles from the tension tubes as the deposit increases and will flow over to the bottom of chamber 70 from where it can be removed.

Carbon tetrachloride is a liquid which is immiscible with glycerine. The carbon tetrachloride, which is a heavier liquid with a lower surface tension, has a greater wetting power towards such a solid surface as thermoplastic material such as polystyrene, etc. In a case where the tubes 69 were made of this plastic material, the carbon tetrachloride with a greater wetting power selectively coated the surfaces, thereby effecting separation of carbon tetrachloride from the glycerine. The emulsion of these two immiscible liquids was forced upwards through the bed of plastic tubes 69, and the separated glycerine was removed at the outlet 72. The carbon tetrachloride acts in this instance in the same manner as the mercury in the previous example.

Likewise, carbon disulphide in water may be filtered out of the water by the apparatus disclosed in Figs. 10, 11 and 12. Here, also, the tension tubes will have their surfaces of glass and the carbon disulphide deposited upon these glass surfaces, thereby becoming separated from the surrounding water.

The above examples amply illustrate the principles of this invention. The invention is applicable to a wide variety of commercial organic and inorganic liquids which are immiscible with each other and which one may desire to separate from an emulsified condition. The invention is particularly of value for use in grease trap equipment. It should be clearly understood however, that I do not limit myself to the type of equipment used because any suitable mechanical means may be used for causing a uniform stream of an emulsion of immiscible liquids to contact a bed of surfaces. Similarly, any suitable means may be used to remove the separated components after they have been subjected to a separating treatment by the bed of surfaces by means of selective surface tension effects. The surfaces need not necessarily be in the form of circular pipes. Thus, a series of surfaces of any shape may be properly mounted and spaced so that a stream of emulsified materials or a mixture of liquids, as the case may be, may be passed over these surfaces. The chamber in which the bed of surfaces is placed, the baffle means for properly directing the stream, and the means for feeding and removing the separated liquors can all be varied to suit the particular installation without departing from the scope of the invention.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A hydraulic filtering device for dispersions of liquid-liquid or liquid-solid materials having different surface tensions comprising a chambered body provided with an inlet and an outlet, a removable channeled element in said body, said channeled element adapted to receive the incoming mixture entering said inlet, and a plurality of parallel pipes carried by and removable with said channeled element, said pipes being provided with surfaces having a selective surface tension separating effect whereby one of the components of the mixture will be selectively accumulated about said surfaces to form a hydraulic filtering bed.

2. A hydraulic filtering device for dispersions of liquid-liquid or liquid-solid materials having different surface tensions comprising a chambered body provided with an inlet and an outlet, a plurality of substantially parallel pipes in said chambered body and provided with surfaces having a selective surface tension separating effect, and means for removably mounting said pipes in spaced but grouped relation in the path of flow between said inlet and said outlet whereby to effect a substantial accumulation of one of the components of the dispersion between and about said pipes and to form thereby a hydraulic filtering bed.

3. A hydraulic filtering device for dispersions of liquid-liquid or liquid-solid materials having different surface tensions comprising a chambered body provided with an inlet and an outlet, a plurality of spaced elements provided with surfaces having a selective surface tension separating effect, a pair of spaced walls forming a longitudinal chamber into which the dispersion flows upon entering said chambered body through its said inlet, said elements being supported by and in crosswise relation with said spaced walls, and additional walls providing a second channel lying substantially parallel and adjacent to said elements, said second channel receiving the dispersion upon leaving said first channel and feeding the same to said elements.

4. A hydraulic filtering device for dispersions or emulsions of liquid-liquid or liquid-solid materials having different surface tensions comprising a chambered body provided with an inlet and an outlet, a plurality of spaced elements provided with surfaces having a selective surface tension separating effect, a pair of spaced walls forming a longitudinal chamber into which the dispersion flows upon entering said chambered body through its said inlet, said elements being supported by and in crosswise relation with said spaced walls, and additional walls providing a second channel lying substantially parallel and adjacent to said elements, said second channel receiving the dispersion upon leaving said first channel and flowing the dispersion over and upon said elements, said elements lying across said first channel and in the path of flow of the dispersion to reduce its turbulence and velocity before being received by said second channel.

5. A grease trap comprising a hollow body having an inlet, an outlet spaced from said inlet, means disposed between said inlet and said outlet for separating the grease from the liquid entering said inlet, the position of said outlet below the top of said body determining the normal liquid level in the body to provide an air space therein above said level, a passage extending downwardly from said outlet to communicate with said body near the lower portion thereof, a wall providing a second passage lying within the first passage, there being an opening adjacent to the top of the second passage to connect the air space above said liquid level with said second passage, said second passage terminating in said first passage in proximity of the lower limit of said outlet.

6. A grease trap comprising a hollow body having an inlet, an outlet spaced from said inlet, means disposed between said inlet and said outlet for separating the grease from the liquid entering said inlet, the position of said outlet below the top of said body determining the normal liquid level in the body to provide an air space therein above said level, a passage extending downwardly from said outlet to communicate with said body near the lower portion thereof, a wall providing a second passage lying within the first passage, there being an opening adjacent to the top of the second passage to connect the air space above said liquid level with said second passage, said second passage terminating in said first passage in proximity of the lower limit of said outlet, and a vent connection leading to the exterior of said body communicating with said second passage.

7. A grease trap comprising a hollow body having an inlet, an outlet spaced from said inlet, means disposed between said inlet and said outlet for separating the grease from the liquid entering said inlet, the position of said outlet below the top of said body determining the normal liquid level in the body to provide an air space therein above said level, a passage extending downwardly from said outlet to communicate with said body near the lower portion thereof, a wall providing a second passage lying within the first passage, there being an opening adjacent to the top of the second passage to connect the air space above said liquid level with said second passage, said second passage terminating in said first passage in proximity of the lower limit of said outlet, and a vent connection leading to the exterior of said body communicating with said first passage.

8. A grease trap comprising a hollow body having an inlet, an outlet spaced from said inlet, means disposed between said inlet and said outlet for separating the grease from the liquid entering said inlet, the position of said outlet below the top of said body determining the normal liquid level in the body to provide an air space therein above said level, a passage extending downwardly from said outlet to communicate with said body near the lower portion thereof through which the liquid separated from the grease flows to said outlet, a wall providing a second passage lying within the first passage, and a chamber communicating with said second passage, there being an opening between said chamber and the air space above said normal liquid level in said body, said chamber communicating with said second passage at a point above said opening.

9. A hydraulic filtering device for dispersions of liquid-liquid or liquid-solid materials having different surface tensions comprising a chambered body provided with an inlet and an outlet, means including a wall structure for reducing the flow of the dispersion progressively between said inlet and said outlet, a plurality of elements having surfaces with a selective surface tension separating effect, means for mounting said elements in grouped relation but spaced from each other in the path of reduced flow between said inlet and said outlet to establish a substantial accumulation of one of the components of the dispersion between and about said surfaces of said elements to form a hydraulic filtering bed, said filtering bed including said elements and said accumulation.

10. A hydraulic filtering device for dispersions of liquid-liquid or liquid-solid materials having different surface tensions comprising a chambered body provided with an inlet and an outlet, a plurality of pipes having surfaces with a selective surface tension separating effect, means for mounting said pipes in grouped relation but spaced from each other in the path of flow between said inlet and said outlet to establish a substantial accumulation of one of the components of the dispersion between and about said surfaces of said pipes to form a hydraulic filtering bed, and air separating means mounted in said chambered body and in the path of flow tending to reduce the flow and to liberate entrapped air from the dispersion after it enters said chambered body at said inlet and before it reaches said hydraulic filtering bed.

11. A hydraulic filtering device for dispersion of liquid-liquid or liquid-solid materials having different surface tensions comprising a chambered body provided with an inlet and an outlet, members of channel formation in said chambered body, one of said members being disposed at said inlet to receive the incoming mixture and to feed the same to a second member, there being means associated with said first member to reduce the flow of said incoming mixture, and a plurality of elements having surfaces with selective surface tension separating effect adapted to contact the mixture flowing from said second member, said elements being in grouped relation but spaced from each other and mounted adjacent said second member to allow a substantial accumulation of one of the components of the dispersion to form between and about said surfaces of said elements to establish a hydraulic filtering bed that includes said elements and said accumulation.

12. A hydraulic filtering device for dispersion of liquid-liquid or liquid-solid materials having different surface tensions comprising a chambered body provided with an inlet and an outlet, members of channel formation disposed adjacent to said inlet and in said chambered body, one of said members receiving the incoming mixture entering at said inlet and feeding the same to a second member, there being means associated with both of said members to reduce the flow of said incoming mixture, and a plurality of elements having surfaces with selective surface tension separating effect adapted to receive the mixture from said second member, said elements being mounted in grouped relation but being spaced from each other to allow a substantial accumulation of one of the components of the dispersion to form between and about said surfaces of said elements to establish a hydraulic filtering bed that includes said elements and said accumulations.

13. A hydraulic filtering device for dispersion of liquid-liquid or liquid-solid materials having different surface tensions comprising a chambered body provided with an inlet and an outlet, a member of channel formation disposed adjacent said inlet and in said chambered body to receive the incoming mixture entering said inlet, baffle means to change the direction of flow of said mixture after it has passed through said member, and a plurality of elements having surfaces with selective surface tension separating effect, said elements being arranged in grouped relation but spaced from each other, and means adjacent said last means to flow said mixture over said surfaces to allow a substantial accumulation of one of the components of the dispersion to form between and about said surfaces of said elements to establish a hydraulic filter bed.

14. A hydraulic filtering device for dispersions of liquid-liquid or liquid-solid materials having different surface tensions comprising a chambered body provided with an inlet and an outlet, a removable channeled element in said body disposed adjacent to said inlet, said channeled element adapted to receive the incoming mixture entering said inlet, and a plurality of elements having surfaces carried in spaced relation by and removable with said channeled element, said surfaces having a selective surface tension separating effect to establish a substantial accumulation of one of the components of the dispersion between and about said surfaces to form a hydraulic filtering bed.

15. A hydraulic filtering device for dispersions of liquid-liquid or liquid-solid materials having different surface tensions comprising a chambered body provided with an inlet and an outlet, a plurality of grouped but spaced parallel pipes in said chambered body and provided with surfaces having a selective surface tension separating effect, and means including a wall structure for reducing and directing the flow of the dispersion over said pipes to establish a substantial accumulation of one of the components of the dispersion between and about said surfaces and to form thereby a hydraulic filtering bed.

16. In the hydraulic filtration of the components of a dispersion of insoluble materials having different surface tensions, the process of employing a group of elements having surfaces arranged in spaced relation to each other to subject the dispersion to a selective surface tension separating effect for one of the components to provide thereby an accumulation of said component about said surfaces to form a hydraulic filtering bed, and maintaining said filter bed by controlling the rate of flow of said dispersion.

17. In the hydraulic filtration of the components of a dispersion of insoluble materials having different surface tensions, the process of employing a plurality of elements having surfaces in grouped but spaced relation to subject the dispersion to a selective surface tension separating effect for one of the components and creating thereby an accumulation of said component on and about said surfaces to form a hydraulic filtering bed, and maintaining said filter bed by controlling the rate of flow of said dispersion.

STEPHEN F. RESAN.

REFERENCES CITED

The following references are of record in the file of this patent:

UNITED STATES PATENTS

| Number | Name | Date |
|---|---|---|
| 691,365 | Dittler | Jan. 21, 1902 |
| 990,959 | Cresswell | May 2, 1911 |
| 1,474,938 | Marsh | Nov. 20, 1923 |
| 1,537,260 | Patrick | May 12, 1925 |
| 1,591,852 | MacArthur | July 6, 1926 |
| 1,665,164 | Gard et al. | Apr. 3, 1928 |
| 1,804,743 | Cannon | May 12, 1931 |
| 1,873,597 | Jones | Aug. 23, 1932 |
| 1,947,709 | Garrison et al. | Feb. 20, 1934 |
| 1,955,064 | Hawley | Apr. 17, 1934 |
| 2,059,844 | Boosey | Nov. 3, 1936 |
| 2,084,958 | Hunter | June 22, 1937 |
| 2,118,157 | Camp | May 24, 1938 |
| 2,137,421 | Tark | Nov. 22, 1938 |
| 2,214,248 | Hawley | Sept. 10, 1940 |
| 2,216,300 | Shenk | Oct. 1, 1940 |
| 2,226,532 | Hawley | Dec. 31, 1940 |
| 2,228,353 | Howes | Jan. 14, 1941 |
| 2,324,190 | Boosey | July 13, 1943 |
| 2,346,435 | Johnson | Apr. 11, 1944 |
| 2,362,447 | Boosey | Nov. 14, 1944 |
| 2,405,838 | Lawson et al. | Aug. 13, 1946 |
| 2,412,841 | Spangler | Dec. 17, 1946 |

FOREIGN PATENTS

| Number | Country | Date |
|---|---|---|
| 9,770 | Great Britain | of 1913 |

OTHER REFERENCES

Colloid Chemistry by Alexandria, vol. 1, page 233, 1926, vol. III, pages 41-48 and page 57, 1931.